(12) United States Patent
Chung

(10) Patent No.: US 7,902,455 B2
(45) Date of Patent: Mar. 8, 2011

(54) LIGHTNING ARRESTER

(76) Inventor: Young-Ki Chung, Seoul (KR)

( * ) Notice: Subject to any disclaimer, the term of this patent is extended or adjusted under 35 U.S.C. 154(b) by 0 days.

(21) Appl. No.: 11/920,595

(22) PCT Filed: Feb. 21, 2007

(86) PCT No.: PCT/KR2007/000892
§ 371 (c)(1),
(2), (4) Date: Mar. 17, 2008

(87) PCT Pub. No.: WO2008/084895
PCT Pub. Date: Jul. 17, 2008

(65) Prior Publication Data
US 2009/0308630 A1    Dec. 17, 2009

(30) Foreign Application Priority Data

Jan. 12, 2007   (KR) .................. 10-2007-0003653

(51) Int. Cl.
*H02G 13/00* (2006.01)
(52) U.S. Cl. .................. 174/3; 174/2; 174/5 R; 174/6; 174/7; 174/51; 361/117; 439/98
(58) Field of Classification Search .................. 174/2, 3, 174/5 R, 6, 7, 51, 4 R; 361/117, 216; 439/92, 439/98, 100
See application file for complete search history.

(56) References Cited

U.S. PATENT DOCUMENTS

| | | | | |
|---|---|---|---|---|
| 5,073,678 | A | 12/1991 | Carpenter, Jr. | 174/2 |
| 5,998,731 | A * | 12/1999 | Takamura | 174/3 |
| 6,815,606 | B1 | 11/2004 | Chung | 174/3 |
| 6,943,285 | B2 | 9/2005 | Chung | 174/3 |
| 6,963,026 | B2 * | 11/2005 | Brennan | 174/7 |
| 7,041,895 | B1 * | 5/2006 | Kim | 174/3 |
| 7,365,267 | B2 * | 4/2008 | Kim | 174/3 |
| 7,495,168 | B2 * | 2/2009 | Park | 174/7 |

FOREIGN PATENT DOCUMENTS

| | | |
|---|---|---|
| KR | 2519433 | 5/1996 |
| KR | 20-0201454 | 8/2000 |
| KR | 20-0330621 | 10/2003 |

OTHER PUBLICATIONS

International Search Report and Written Opinion for PCT/KR2007/000892 date mailed October 12, 2007.

* cited by examiner

*Primary Examiner* — Dhiru R Patel
(74) *Attorney, Agent, or Firm* — Ballard Spahr LLP

(57) ABSTRACT

Provided is a lighting arrester capable of preventing damage caused by a lightning by discharging charges charged by approach of a thundercloud. The lightning arrester includes: a conductive rod installed at an upper part of an object to be protected from a lightning and connected to a ground part; a charge pipe having a cylindrical shape, formed of an insulating body to be insulated from the rod, and electrically charged with charges having a polarity opposite to ground charges; and a plurality of charge pins disposed on the charge pipe such that space charges in the air are charged to the pins by a thundercloud.

9 Claims, 3 Drawing Sheets

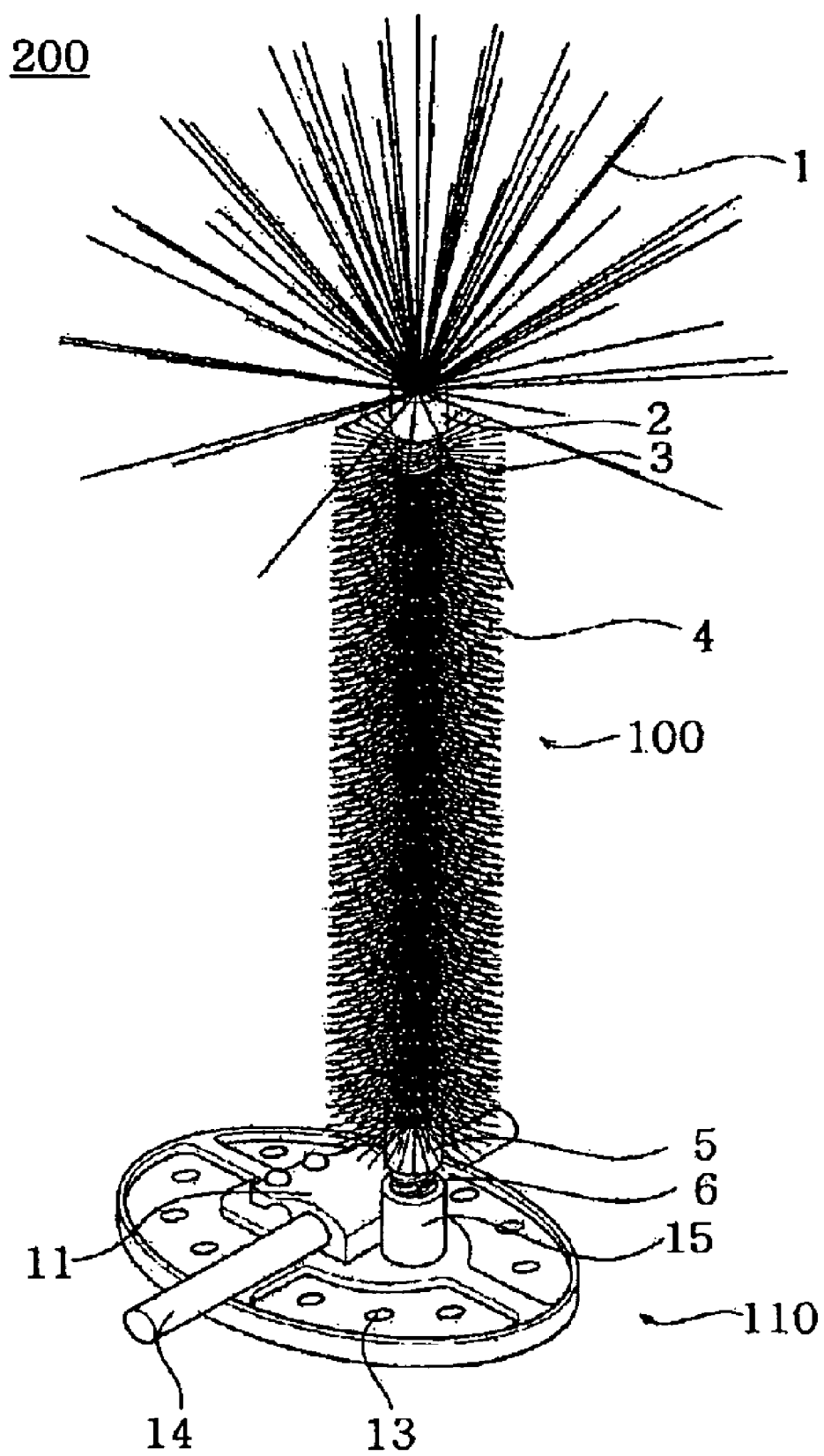
[Fig. 1]

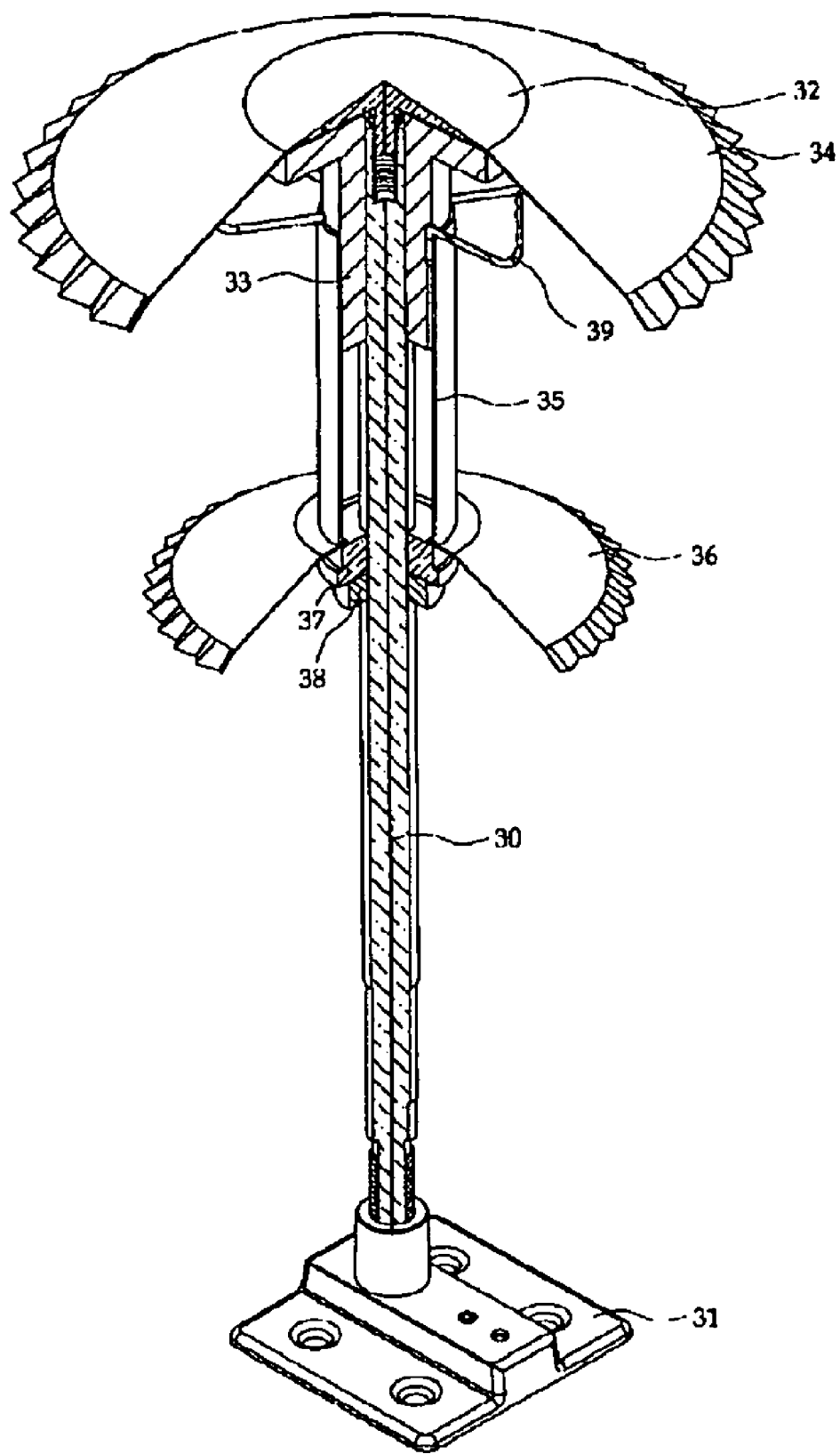
[Fig. 2]

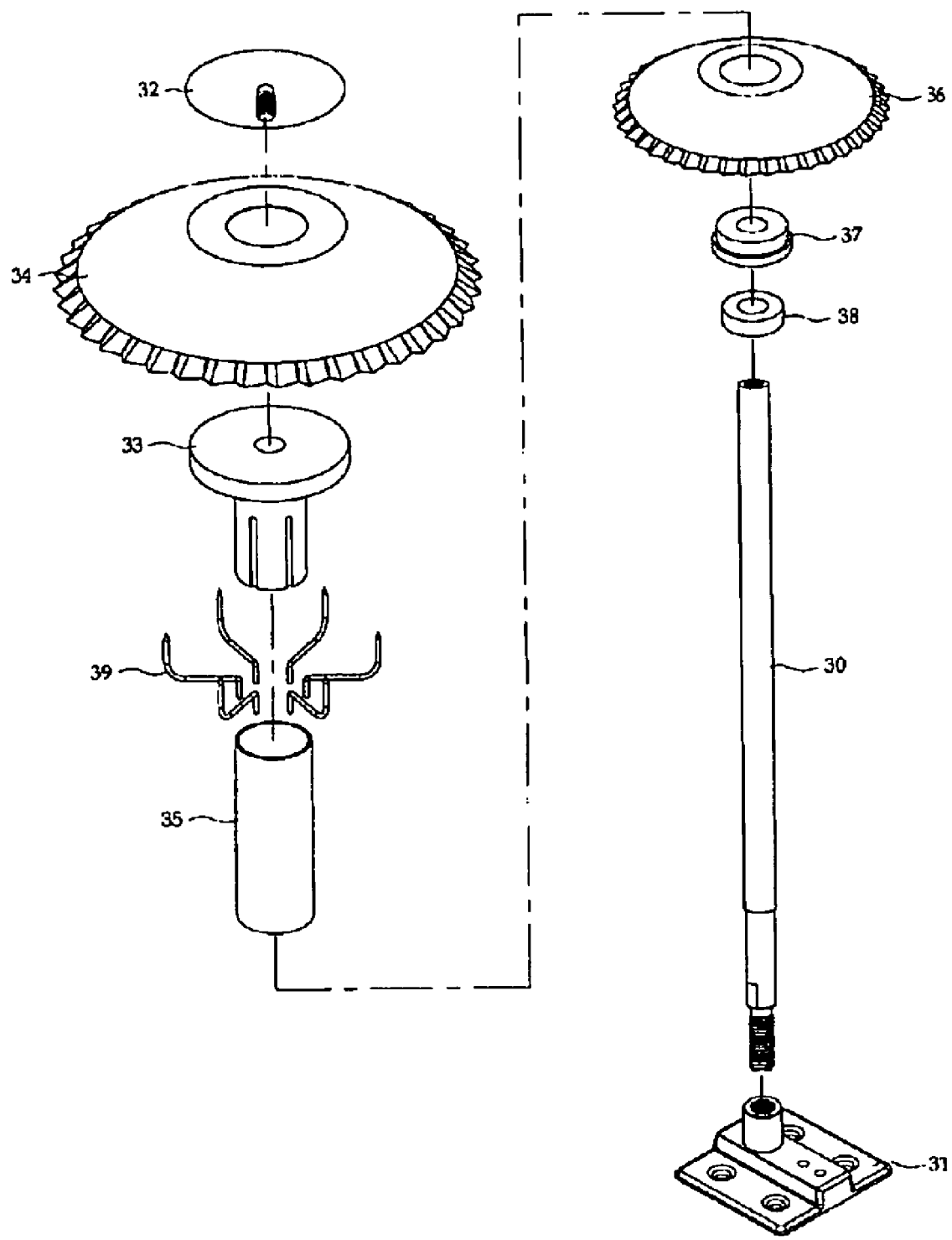
[Fig. 3]

LIGHTNING ARRESTER

CROSS REFERENCE TO RELATED APPLICATIONS

The present application is a National Phase Application of International Application No. PCT/KR2007/000892, filed Feb. 21, 2007, which claims priority to Korean Patent Application No. 10-2007-0003653 filed Jan. 12, 2007, which applications are incorporated herein fully by this reference.

TECHNICAL FIELD

The present invention relates to a lightning arrester, and more particularly, to a lightning arrester capable of preventing damage caused by a lightning by discharging charges charged by approach of a thundercloud.

BACKGROUND ART

Generally, a lightning arrester is installed at the uppermost part of a building to form a discharge path between a thundercloud and the ground to safely flow charges accumulated in the thundercloud to the ground.

When a normal thundercloud approaches the ground, an electric potential difference between the thundercloud and the ground is about one hundred million volts.

In this state, the air in the atmospheric layer functions as a good insulating body to prevent insulation breakdown between the ground and the thundercloud, i.e., a lightning. However, the probability of generating a lightning between the thundercloud and the ground is still in existence.

A lightning arrester using an electric field phenomenon (tip effect) in which an electric field is concentrated to a tip part is referred to as a Franklin rod type.

A theory of a lightning rod using the tip effect is disclosed in Japanese Patent Laid-open Publication No. S62-216197 (Sep. 22, 1987).

The lightning rod using the tip effect uses a natural phenomenon only. Since the lightning rod is operated only when breakdown of an insulation voltage of the air occurs, it is difficult to effectively prevent a lightning in the case that the thundercloud has a hazard just before breakdown of an insulation voltage. For this reason, in this field, various types of lightning arresters have been developed to more effectively and safely discharge charges in the thundercloud to the ground to reduce the number of lightning to an object to be protected.

For example, Korean Utility Model Application No. 2000-13418 discloses an ion radiation lightning rod capable of automatically radiating charges on the ground formed by a thundercloud to collect energy of a downward leader generated during lightning, i.e., drawing the lightning occurring therearound to the lightning rod.

However, the ion radiation lightning rod may also cause huge damage similar to the conventional lightning rod. In addition, a lightning counter should be installed to cause the lightning rod to be complicated, thereby increasing manufacturing cost. Further, since an installation height of the lightning rod is too high, it is difficult to install the lightning rod at the building, and appearance of the building may be deteriorated.

Meanwhile, in order to solve the problem, a lightning arrester is disclosed in Korean Utility Model Registration No. 330621.

As shown in FIG. 1, a lightning arrester 200 of Utility Model Registration No. 330621 includes a lightning rod 100 having splines 1 disposed in a radial manner and formed of a plurality of stainless steel wires, a core 3 formed of four to eight stainless steel wires twisted with each other and supporting the splines 1 at its upper end, a fixing adaptor 2 for collecting one ends of the splines 1 to fix them to an upper end of the core 3, filaments 4 radially twisted with the core 3 and disposed in an outer radial direction of the core 3, and a support adaptor 5 having a threaded part 6 at its lower end; and a lightning rod mounting base 110 formed of a circular metal plate and having bolt holes 13 for fixing the lightning rod mounting base using bolts.

The splines 1 are formed of stainless steel wires having a diameter of about 1 mm and a length of about 25 cm. Here, in order to effectively move charges, ends of the splines 1 are cut at 45. About sixty splines 1 may be provided. The fixing adaptor 2 fixes the splines 1, and is fixed to the upper end of the core 3 through welding, or the like. That is, the plurality of splines 1 are formed of stainless steel wires having one ends inserted into the fixing adaptor 2, and the fixing adaptor 2 is fixed to the core 3 at its lower end through tag welding, or the like.

The splines 1 are aligned in parallel before the lightning arrester 200 is installed at a building or a structure, and radially arranged in a semi-spherical shape as shown in FIG. 1 after the lightning arrester 200 is installed.

The core 3 is formed of four stainless steel wires having a diameter of 3 mm, which are twisted with each other, thereby securely fixing the splines 1 thereon. The filaments 4 are formed of about fifteen hundreds of stainless steel wires having a diameter of 0.1 mm, which are twisted with the core 3 in a radial direction. Here, the filaments 4 are cut at 45 at their ends. The filaments 4 may have a length of about 10 cm.

The support adaptor 5 fixes the core 3 and the filaments 4 radially fixed to the core 3 using welding, or the like. The threaded part 6 is formed at the lower end of the support adaptor 5 and inserted into a female threaded part 15 of the lightning rod mounting base 110, thereby securely fixing the lightning rod 100 to the lightning rod mounting base 110.

The lightning rod mounting base 110 is formed of a circular iron plate, and has the female threaded part 15 for fixing the lightning rod 100 and bolt holes 13 for securely fixing the lightning rod mounting base 110 to a bottom surface. A ground cable 14 and a ground cable fixture 11 are fixed to the lightning rod mounting base 110 using bolts 12.

DISCLOSURE

[Technical Problem]

However, in the ion radiation lightning arrester, dusts or leaves may be stuck or attached to the filaments to decrease performance of the filaments, and thus, the filaments may be corroded to make it difficult to perform its function. Though the splines constitute a large number of points, when an electric field is concentratedly applied to an upper part of the splines, a discharge phenomenon similar to the conventional Franklin rod may be generated. As a result, it is difficult to discharge the lightning arrester by itself, and thus, effect for preventing a lightning may be decreased to a level substantially equal to the conventional lightning rod.

In order to solve the foregoing and/or other problems, it is an aspect of the present invention to provide a lightning arrester capable of improving preliminary discharge performance between space charges and ground charges to prevent damage caused by a lightning by additionally installing a charge pin at the lightning arrester for protecting a building from the lightning.

[Technical Solution]

One aspect of the present invention provides a lightning arrester including: a conductive rod installed at an upper part of an object to be protected from a lightning and connected to a ground part; a charge pipe having a cylindrical shape, formed of an insulating body to be insulated from the rod, and electrically charged with charges having a polarity opposite to ground charges; and a plurality of charge pins disposed on the charge pipe such that space charges in the air are charged to the pins by a thundercloud.

DESCRIPTION OF DRAWINGS

FIG. 1 is a perspective view of a conventional lightning arrester;

FIG. 2 is a partially cut perspective view of a lightning arrester in accordance with an exemplary embodiment of the present invention; and FIG. 3 is an exploded perspective view of the lightning arrester in accordance with an exemplary embodiment of the present invention.

BEST MODE

Exemplary embodiments of the present invention will now be described in detail with reference to the accompanying drawings.

A lightning arrester in accordance with the present invention is installed at a building to be protected from a lightning (hereinafter, referred to as a "building"), and includes separate ground means, i.e., a portion in which ground charges are accumulates through a ground apparatus installed under the ground, and a portion in which space charges generated by a thundercloud are accumulated, thereby preliminarily discharging the ground charges and the space charges to increase a ground voltage to reduce the probability of receiving the lightning.

Hereinafter, constitution and operation of the lightning arrester in accordance with an exemplary embodiment of the present invention will be described with reference to FIGS. 2 and 3.

FIG. 2 is a partially cut perspective view of a lightning arrester in accordance with an exemplary embodiment of the present invention, and FIG. 3 is an exploded perspective view of the lightning arrester in accordance with an exemplary embodiment of the present invention. As shown in FIGS. 2 and 3, the lightning arrester in accordance with the present invention includes a fixing part 31 installed at an upper end of a building and connected to ground means, a rod 30 fixed to the fixing part 31 at its one end to be electrically charged with a ground charge, a rod cap 32 coupled with the other end of the rod 30 to induce a lightning, a discharge plate 34 mounted on the rod 30 under the rod cap 32, a charge pipe 35 having a cylindrical shape, formed of an insulating body 33 to be insulated from the rod, and electrically charged with charges having a polarity opposite to the ground charge, a charge plate 36 coupled with the charge pipe 35 to be electrically charged with charges having a polarity opposite to the ground charge, and a plurality of charge pins 39 disposed on the charge pipe 35 such that space charges in the air are charged to the pins by a thundercloud.

The discharge plate 34 and the charge plate 36 have an inversed parabola shape, which are disposed in a vertical direction and spaced apart from each other. Each of the plates 34 and 36 has a circular holes engaged with the rod 30. Each of the plates 34 and 36 includes a center part formed perpendicular to the rod 30 and a peripheral part extending from the center part in a downwardly inclined direction. The discharge plate 34 has a diameter about twice larger than that of the charge plate 36, and the discharge plate 34 and the charge plate 36 have wrinkled parts formed at their peripheries, respectively.

The insulating body 33 has an upper plate and a vertical bar to form a "T"-shaped cross-section. The vertical bar has a circular hole formed at its center and coupled with the rod 30.

In addition, the charge pipe 35 has a tube shape through which the rod 30 passes. One end of the charge pipe 35 is coupled with the insulating body 33, and the other end of the charge pipe 35 is coupled with a charge cap 37, thereby fixing the charge pipe 35 to the rod 30. The charge plate 36 is insulated from the discharge plate 34 by the upper plate of the insulating body 33, insulated from the rod 30 by the vertical bar, and adhered to the upper plate of the insulating body 33 by a stopper 38 fixed to the rod 30 at its one side.

In addition, the charge pins 39 are primarily bent toward an outer periphery of the discharge plate 34 and then secondarily bent toward an outer periphery of the insulating body 33 at their one sides, and extending inward the charge pipe 35 to be adhered to an inner surface of the charge pipe 35 at the other sides by the vertical bar of the insulating body 33. When the charge pins 39 are secondarily bent toward the insulating body 33, the bent length of the charge pins 39 are larger than the diameter of the insulating body 33, and a gap from the insulating layer 33 is maintained more than 0.5 mm.

Further, the insulating body 33 and the charge cap 37 are formed of a material having electric insulation and dielectric characteristics, for example, titanium dioxide ($TiO_2$), silicon dioxide ($SiO_2$), or the like, and function to increase the capacitance between the rod 30, the discharge plate 34 and the charge pipe 35, thereby more readily discharging them.

Here, the reason for forming the insulating body 33 and the charge cap 37 using the material having electric insulation and dielectric characteristics, for example, titanium dioxide ($TiO_2$), silicon dioxide ($SiO_2$), or the like, is that the material has high mechanical strength to enable to obtain electric insulation and dielectric characteristics and securely maintain structural integrity between the discharge plate 34 and the charge pipe 35.

Operation of the lightning arrester in accordance with an exemplary embodiment of the present invention will be described in below.

First, the fixing part 31 is installed at an upper end, preferably the uppermost part, of a building to be protected from a lightning, and the rod 30, on which the discharge plate 34, the charge pipe 35 and the charge plate 36 are installed, is fixed to the fixing part 31.

Then, when a thundercloud having a high probability of generating a lightning approaches the lightning arrester in accordance with an exemplary embodiment of the present invention, space charges distributed in the air are charged to the charge pipe 35, the charge plate 36, and the charge pins 39 by the thundercloud, and ground charges, i.e., charges having polarities opposite to the space charges and supplied form the ground are charged to the rod 30 and the discharge plate 34.

As described above, as the thundercloud approaches, the space charges are charged to the charge pipe 35, the charge plate 36, and the charge pins 39, which are electrically connected to each other. When the ground charges are gradually charged to the discharge plate 34 and the rod 30 electrically connected to each other, a charge amount is increased to increase a charge voltage between the charge pipe 35, the charge plate 36 and the charge pins 39, and between the discharge plate 34 and the rod 30, thereby discharging them (generally, corona discharge).

At this time, the charge pins 39 extend inward the charge pipe 35 to be adhered thereto by the vertical bar of the insulating body 33. Since the charge pins 39 are bent inward the discharge plate 34, it is possible to readily perform discharge between the space charges and the ground charges.

In addition, the insulating body 33 is interposed between the discharge plate 34 and the charge pipe 35 to increase a charge accumulation amount between the discharge plate 34 and the charge pipe 35 and thus a potential difference between the space charges and the ground charges is increased, thereby more readily discharging them.

Further, the charge plate 36 is coupled with the charge pipe 35 by the charge cap 37 to prevent discharge in a direction of the stopper 38 and increase discharge performance with the rod 30, thereby readily performing the discharge between the space charges and the ground charges.

As described above, the lightning arrester in accordance with an exemplary embodiment of the present invention discharges the ground charges supplied from the ground through the building and the space charges distributed around the building by a thundercloud before a lightning occurs, thereby blocking concentration of the ground charges to decrease an electric field of the entire building.

When the electric field of the building is decreased lower than an electric field for generating a lightning (a lightning electric field), it is possible to remarkably reduce a probability of generating a lightning.

INDUSTRIAL APPLICABILITY

As can be seen from the foregoing, when a thundercloud having a high probability of generating a lightning approaches, it is possible to preliminarily discharge space charges distributed in the air and ground charges supplied from the ground to reduce the probability of generating a lightning and prevent a probability of corrosion.

Especially, charge pins are interposed between discharge means and a charge pipe, and charge means is installed at a tip of the charge pipe, thereby more increasing discharge capability by the space charges and the ground charges.

While few exemplary embodiments of the present invention have been shown and described, it will be appreciated by those skilled in the art that various changes may be made to these embodiments without departing from the spirit and scope of the invention as defined by the appended claims and their equivalents.

The invention claimed is:

1. A lightning arrester comprising:
a conductive rod installed at an upper part of an object to be protected from a lightning for connection to ground at one end;
a rod cap electrically coupled with the other end of the rod;
a discharge plate electrically coupled with the rod under the rod cap and to which ground charges supplied from the ground may be charged;
a charge pipe having a cylindrical shape surrounding the rod, formed of an insulating body to be insulated from the rod, such that it may be electrically charged with charges having a polarity opposite to ground charges;
a charge plate electrically coupled with the charge pipe; and
a plurality of charge pins disposed on and electrically connected to the charge pipe such that space charges in the air are charged to the pins by a thundercloud, wherein the ends of the charge pins are spaced a distance from the discharge plate such that potential between the space charges from the pins and the ground charges on the discharge plate may cause a discharge.

2. The lightning arrester according to claim 1, wherein the insulating body comprises a dielectric material.

3. The lightning arrester according to claim 2, wherein the dielectric material comprises titanium dioxide ($TiO_2$) or silicon dioxide ($SiO_2$).

4. The lightning arrester according to claim 1, wherein the insulating body has an upper plate and a vertical bar, which form a "T"-shaped cross-section.

5. The lightning arrester according to claim 1, wherein the discharge plate has an inversed parabola shape.

6. The lightning arrester according to claim 1, wherein the charge plate has a diameter smaller than that of the discharge plate, and has an inversed parabola shape.

7. The lightning arrester according to claim 1, wherein each of the charge pins are primarily bent toward a periphery of the discharge plate and secondarily bent toward a periphery of the insulating body at its one end, and extends inward the charge pipe at the other end.

8. The lightning arrester according to claim 7, wherein each of the charge pins are secondarily bent to a length larger than a diameter of the insulating body, and has a gap spaced apart from the insulating body by a predetermined distance.

9. The lightning arrester according to claim 7, wherein the predetermined distance is 0.5 millimeter or more.

* * * * *